(12) United States Patent
Malone

(10) Patent No.: US 9,468,198 B2
(45) Date of Patent: Oct. 18, 2016

(54) SYSTEMS AND METHODS FOR AQUATIC ELECTRICAL BARRIER DESYNCHRONIZATION

(71) Applicant: SMITH-ROOT, INC., Vancouver, WA (US)

(72) Inventor: Douglas Malone, Vancouver, WA (US)

(73) Assignee: Smith Root, Inc, Vancouver, WA (US)

( * ) Notice: Subject to any disclaimer, the term of this patent is extended or adjusted under 35 U.S.C. 154(b) by 375 days.

(21) Appl. No.: 14/172,845

(22) Filed: Feb. 4, 2014

(65) Prior Publication Data

US 2014/0254060 A1 Sep. 11, 2014

Related U.S. Application Data

(60) Provisional application No. 61/774,388, filed on Mar. 7, 2013.

(51) Int. Cl.
| | |
|---|---|
| *A01K 63/00* | (2006.01) |
| *A01K 79/02* | (2006.01) |
| *A01K 61/00* | (2006.01) |
| *A01K 91/00* | (2006.01) |
| *E02B 1/00* | (2006.01) |

(52) U.S. Cl.
CPC .............. *A01K 79/02* (2013.01); *A01K 63/00* (2013.01); *A01K 61/001* (2013.01); *A01K 91/00* (2013.01); *E02B 1/006* (2013.01)

(58) Field of Classification Search
USPC .......................................... 361/232; 119/220
See application file for complete search history.

(56) References Cited

U.S. PATENT DOCUMENTS

| | | | | |
|---|---|---|---|---|
| 5,610,876 A | * | 3/1997 | Jeffers ................... | A01K 29/00 367/139 |
| 6,016,119 A | * | 1/2000 | Krasner ................ | G01S 5/0027 342/357.34 |
| 2008/0062039 A1 | * | 3/2008 | Cohen .................... | G01S 19/05 342/357.29 |
| 2011/0174231 A1 | * | 7/2011 | Edmondson ........... | A01K 79/02 119/220 |

* cited by examiner

*Primary Examiner* — Danny Nguyen
(74) *Attorney, Agent, or Firm* — J. Curtis Edmondson; Law Offices of J. Curtis Edmondson

(57) ABSTRACT

The apparatus and methods are described for an electrical fish barrier system that has more than one geographically separate pulsator that are connected to a common electrical grid and are synchronized to prevent the overlapping of electrical pulses to prevent line notching or local line electrical line noise that may interfere with railroad transmission lines.

11 Claims, 6 Drawing Sheets

SYSTEMS AND METHODS FOR AQUATIC ELECTRICAL BARRIER DESYNCHRONIZATION

RELATED APPLICATIONS

This application claims the benefit of U.S. Provisional Patent Application 61/774,388 filed on Mar. 7, 2013, the contents herein incorporated by reference.

BACKGROUND

Large aquatic electrical barriers are installed for various purposes related to aquatic species management, especially in the field of non-native species management. The goal is to protect the habitats or microhabitats from the effects of non-native species.

Aquatic electrical barriers are deployed in two general scenarios: the first is for the prevention of fish passage from one location to another, and the second is for inducing fish to move from one locality to another. In the first scenario, an electrical field is used to prevent fish from moving between two locations: from a river or stream to a lake, from a river or stream to an irrigation canal, from a river to a hydroelectric facility intake, or from migrating upstream that would avoid entry into a fish hatchery. In the second scenario, an electrical field is used to guide fish: to induce fish movement out of a navigation lock to insure that it is devoid of fish before the entry of a boat into that lock. In both scenarios, the electrical field is used as a mechanism the movement of invasive and/or native species.

Aquatic electrical barriers pass an electrical current through a body of water which, in turn, causes a physiological reaction by the aquatic species. A terrestrial analog to aquatic barriers is the "electric fence". Both aquatic barriers and electric fences use electric current to cause a deterrent effect. But since aquatic species are immersed in a conductive liquid, (e.g. water), the gradient electric field is continuous as opposed to the contact imposed field of the electric fence. This gradient field is caused by placing a conductive anode and cathode in the water and by passing a current between the conductors.

The physiological reactions of an aquatic species that is affected by an aquatic barrier are typically categorized as repulsion, narcosis ("stunning"), and euthanasia ("death").

The aforementioned physiological responses generally correlate to the is amount of electrical power that is transferred from the water to the aquatic species. The electrical power transfer occurs as a result of the body of the fish acting as a "voltage divider" in the water. The total amount of energy that is transferred from the water to the aquatic species is calculated by measuring the potential difference across the fish, multiplied by the duty cycle of the pulse, and which is then multiplied by the electrical current that passes through the fish.

Large waterways typically have a barrier system that consists of several electrical barriers that are separated by distances ranging from approximately 200 to 1500 feet. The DC pulse generators that are installed at these barriers are powered by high voltage supplies ("pulsators") that are connected to the commercial electrical grids. A representative example of such a barrier system is located in the Chicago Sanitary and Ship Canal, where the width of the canal is 160 ft, the depth of the canal is approximately 25 ft, and the conductivity of the water general does not usually exceed 3500 micro Siemens. In this barrier system, a single pulsator has high power output which can reach 1,500 kW.

In large electric fish barrier systems, the use of multiple pulsators are configured to create a series of physically separate electric fields that improve's the deterrence of fish. The barrier system's use of multiple pulsators is also necessary in the event of the failure of one pulsator. Therefore, operating multiple pulsators, that are located physically in series on a waterway, can more effectively prevent is the upstream and/or downstream migration of fish by reducing or screening the number of fish as the water flows through each successive barrier.

Pulsators in a fish barrier system can operate individually (un-synchronized) but are almost always connected to a common electrical grid. While each pulsator in the barrier may be outputting pulses at a fixed frequency, the individual pulses from one pulsator occur are unsynchronized with respect to the pulses from other pulsators in the installation. It is also not uncommon for the individual pulses to slowly drift in time with respect to each other. This results in repetitive periods of time where the pulses occur at unique points in time and later can be seen to be partially or fully temporally overlapped with each other. Overlapping pulses of individual pulsators in an electrical barrier system is undesirable.

There are at least three situations where the unsynchronized operation of multiple pulsators is undesirable:
1) Where there is a navigation lock in the waterway, there is a need to synchronize the energized pairs of bottom mounted electrodes. The objective is to simultaneously expose the fish to physically undesirable (electrified) zones and more desirable (non-electrified) zones that provide the fish with an avenue of escape. In this configuration, it is essential that the individual pulsators connected to the electrodes are synchronized.
2) When high-power pulsators are utilized, there is the possibility that the pulsators cause electrical disturbances that are fed back into the AC power line. AC "line notching" is an example of such a disturbance and is characterized by a sudden, short duration, drop in voltage during a portion of the AC line sine wave. The magnitude of the line notching increases when the output from two (or more) pulsators occur at the same point in time. If the output of the pulsators can be synchronized so that their output pulses occur at unique time "slots" or "windows" then the peak amplitude of line notching can be minimized.
3) The electrodes of electric fish barrier typically do not rest on a perfectly electrically insulating substrate. A small percentage of pulsator current will flow through the substrate and into the rock/earth locally surrounding the in-water electrodes. When the pulses of geographically separate pulsators temporally overlap, a stray electrical current may be induced between the substrates that increases the probability of an interference with adjacent electronic signaling systems.

As noted, during operation, these large pulsators can create localized potential disturbances consisting of, but not limited to: ground loops, line notching, harmonic distortion, and an excessive power factor (collectively "local electrical disturbances"). These local electrical disturbances can also introduce signal noise into local conductors. These local conductors include, but are not limited to local railroad signaling lines which are used for controlling railroad devices, such as cross arms. Signal noise, on these railroad signal lines, can cause local transmission errors which results in operational malfunctions. Although these operational malfunctions (typically cross arms being deployed when a train is not in the proximity) are an inconvenience and are costly for those individuals affected by the malfunction and for the companies must service these types of malfunctions.

The conventional solution to pulsator de-synchronization is to use interconnecting synchronization wires. Wires are susceptible to damage and are expensive to install. It is not uncommon for buried cables to be disturbed and/or broken by earth moving activities such as road building, trenching, general construction, etc.

Although there is prior art that describes the use of GPS to synchronize electrical equipment, for example, U.S. Pat. No. 8,044,855 to Hanabusa on Oct. 25, 2011. But the '855 patent does not describe apparatus and methods for wireless electrical barrier system pulsator desychronization. U.S. Pat. No. 7,333,725 issued to Frazier on Feb. 19, 2008 describes a system for the synchronization of sensors, but this printed publication fails to describe or illustrate how synchronize multiple barriers would operate within an electric barrier system.

Although electrical currents affect all aquatic species, the term "fish" is used in this application to be synonymous with aquatic species and is not to limit the scope of this term.

Therefore, what is needed is a solution that provides for an improved aquatic barrier system that provides for electrical pulse desynchronization between individual pulsators.

BRIEF SUMMARY OF THE INVENTION

The inventive subject matter is directed towards an apparatus for the desynchronization of electrified barrier pulsators so that one or more electrified barrier is capable of receiving a synchronization signal and creating an electrical field that will deter and/or guide aquatic species.

Also described is a system that uses a timing reference point generator by Global Positioning System that is accessed by pulsator synchronizers that are capable of generating a synchronized electrical field to control aquatic species.

Further described is the process for the exclusion of invasive aquatic species involving desynchronized aquatic barriers where a series of geographically separated electrical aquatic barriers create periodic pulses and these periodic pulses activate aquatic barriers by a commonly referenced signal so that there is minimum or no overlap in the electrification of the aquatic barriers.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE INVENTION

Figure 1:
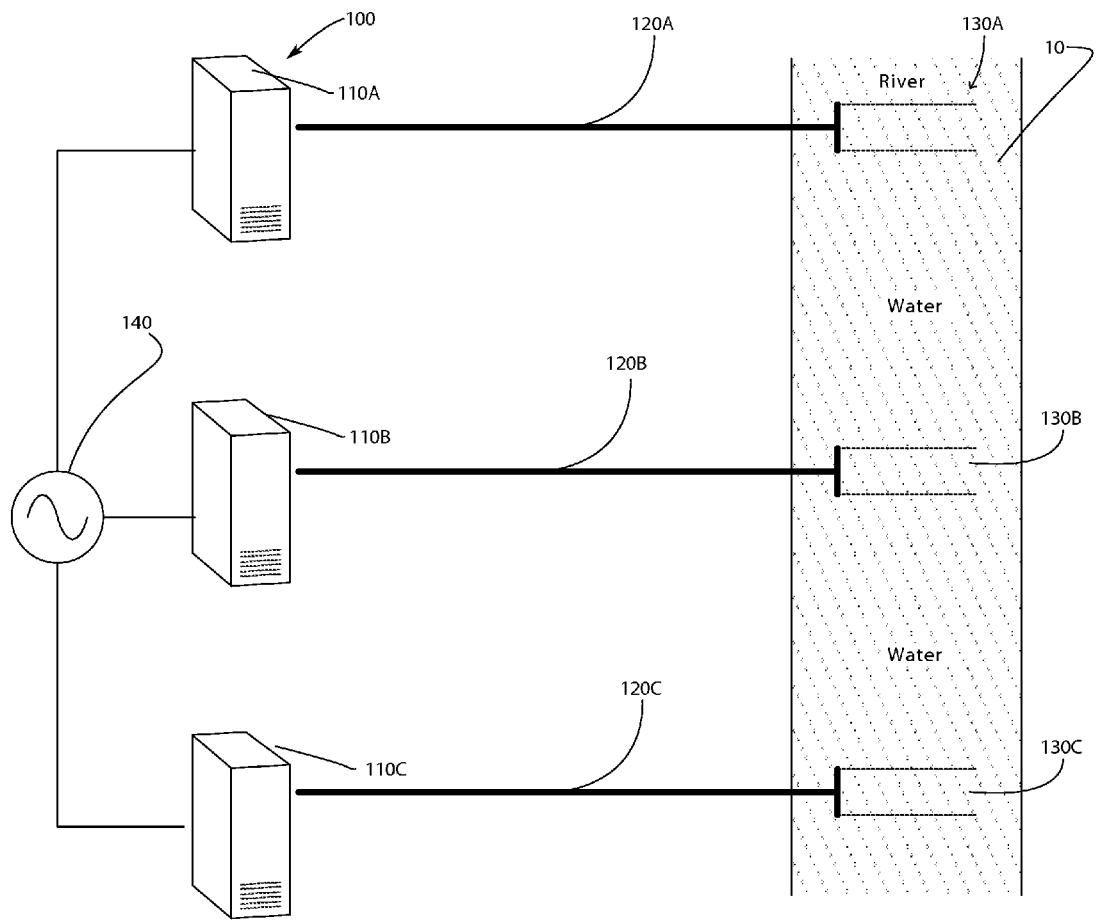
FIG. 1 depicts the prior art architecture of the aquatic species system barrier.

Reference will now be made in detail to embodiments, examples of which are illustrated in the accompanying drawings, wherein like reference numerals refer to the like elements throughout. Embodiments are described below to explain the disclosure by referring to the figures.

Now referring to FIG. 1 which depicts the prior art of an electrical fish barrier system 100. The electrical fish barrier system has at least two pulsators 110A, 110B, 110C that are physically separated. Connected to the pulsators 110A, 110B, 110C are the electrodes (anode/cathode pairs) 130A, 130B, 130C on one side and the pulsator controllers 120A, 120B, 120C on the other. Energy from common electrical grid 140 passes through the pulsators 110A, 110B, 110C to which is converted and energizes the electrodes (anode/cathode pairs) 130A, 130B, 130C, that are immersed in a body of water 10. The magnitude and duration of each electrical pulse is determined by the pulsator controllers 120A, 120B, 120C. Typically this pulse has a frequency of 10 times per second (10 Hz) with a pulse width of 0.005 seconds (5 mS).

Figure 2:
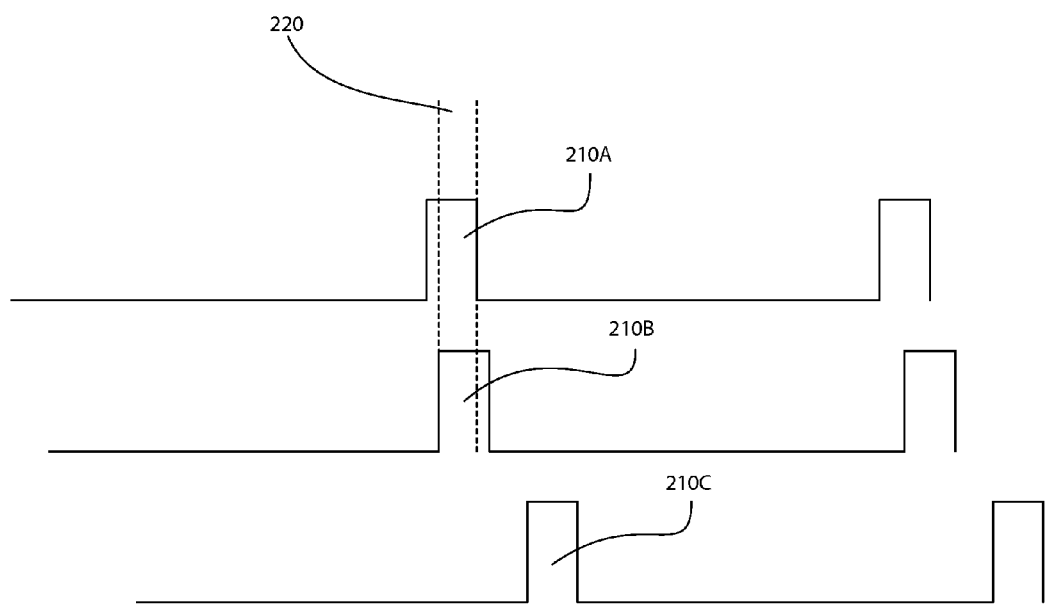
FIG. 2 shows an unsynchronized pulse diagram for the signals generated by three barriers with overlap

Now referring to FIG. 2 which illustrates a timing diagram of the unsynchronized pulsators on an electrical barrier system. In certain circumstances, signal drift occurs when the pulse 210A from the first pulsator 110A overlaps 220 with the pulse 210B from second pulsator 110B. When these pulses overlap, a local electrical imbalance may be created that will induce line notching or noise in conductors that are in the vicinity.

Figure 3:
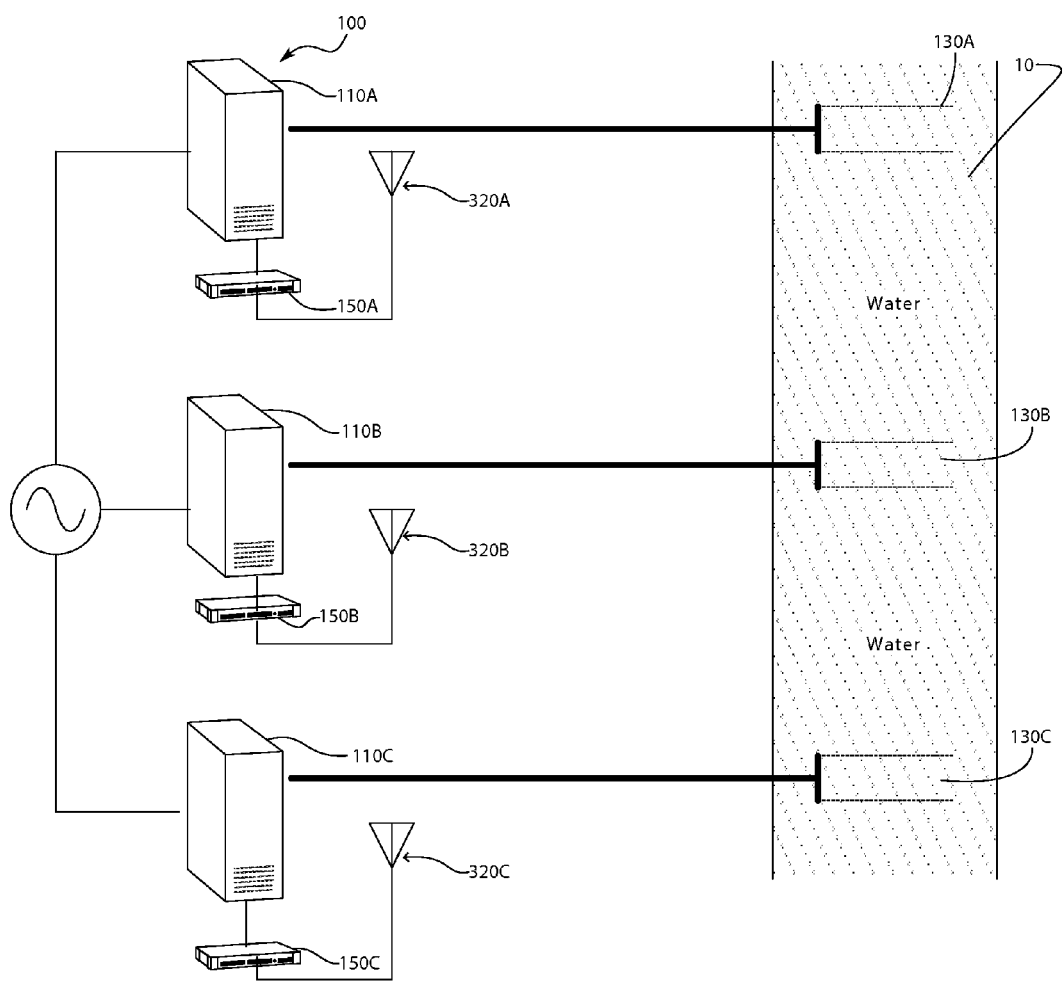
FIG. 3 depicts the architecture of the improved aquatic species system barrier.

Now referring to FIG. 3 which illustrates the electrical fish barrier system diagram with the synchronized barriers. Each pulsator 110A, 110B, 110C is connected to a dedicated antenna 320A, 320B, 320C with a receiver controller that references the Global Positioning System (GPS).

Those skilled in the arts will understand that various options exist for the reception and generation of the timing signals. One option is to utilize signals from GPS (Global Positioning System) satellites. GPS is a constellation of earth-orbiting satellites whose purpose is to provide navigation and timing reference signals, and is managed by the US government. Another option is to use signals from GLONASS (Globalnaya Navigatsionnaya Sputnikovaya Sistema) satellites that are managed by Russia. Another option is to use signals from the EGNOS (European Geostationary Navigation Overlay Service) or Galileo satellite navigation system managed by the European Union. Yet another option is to utilize signals from the Chinese BeiDou satellite navigation system.

Further, suitable commercially available Global Navigation Satellite System (GNSS) receivers exist that simultaneously receive signals from two or more GNSS systems. An example is the Trimble BD910 which is capable of simultaneously receiving signals from GPS, Galileo, Glonass, and BeiDou satellites.

Another option, depending on the geographic location of the pulsators, is to use the timing signal from a QZSS (Quasi-Zenith Satellite System). Those skilled in the arts will additionally know that the desired timing signals can also be derived from the timing signal from the output of a suitable receiver designed for reception of 60 KHz transmissions from terrestrial radio station WWVB, operated by the National Institutes of Standards and Technology (NIST) which is an agency of the U.S. Department of Commerce. An example of this type of receiver is the Model 8160A with option 15, manufactured by Spectracom Corporation. Another option is to derive the timing signal from a receiver designed to receive the radio transmission from other precision time and frequency stations such as 3.330 MHz and 7.85 MHz broadcasts from station CHU in Canada, 2.5 MHz, 5.0 MHz, 10 MHz, 15 MHz, and 20 MHz transmissions from WWV and WWVH in Fort Collins, Colo., 3.810 MHz transmissions from station HD2 IOA in Ecuador, 9.9996 MHz transmissions from RWM in Russia, and others. Another possibility is to use is a Low Frequency receiver, such as the UrsaNav UN-151B, that can provide precise time and frequency from LORAN-C (Long Range Aid to Navigation), Enhanced LORAN (eLORAN), Chayka (Russian terrestrial radio navigation system similar to American LORAN), or other suitable low/medium frequency sources.

In addition to the GNSS receiver, a second essential component of the receiver/controller is a Disciplined Oscillator (DO). A typical DO is a high quality quartz or rubidium oscillator whose frequency is disciplined or steered by locking to the output to a GPS signal via a tracking loop. Integrated GNSS receiver/DO modules are available from various manufacturers. If a GPS receiver and DO module is used it is referred to as a "GPSDO". One example of a suitable GPSDO module is the Trimble Thunderbolt "E GPS" Disciplined Clock.

One advantage of utilizing a GPSDO is its fault tolerance. If the GPS signal is lost, then a "GPS Lock" signal is no longer asserted and the system can issue an alarm. When the "GPS Lock" signal is no longer asserted, the timing signal is derived from an internal high-accuracy oscillator that is typically either a temperature compensated crystal oscillator (TCXO), single or double oven controlled crystal oscillator (OCXO), Rubidium oscillator, Cesium oscillator, or Chip Scale Atomic Oscillator (CSAO). Although the internal oscillator is subject to a change in frequency with respect to time, this change or "frequency drift" is very slow, such that weeks will elapse before there is an occurrence of undesired is pulse overlap.

Figure 4:
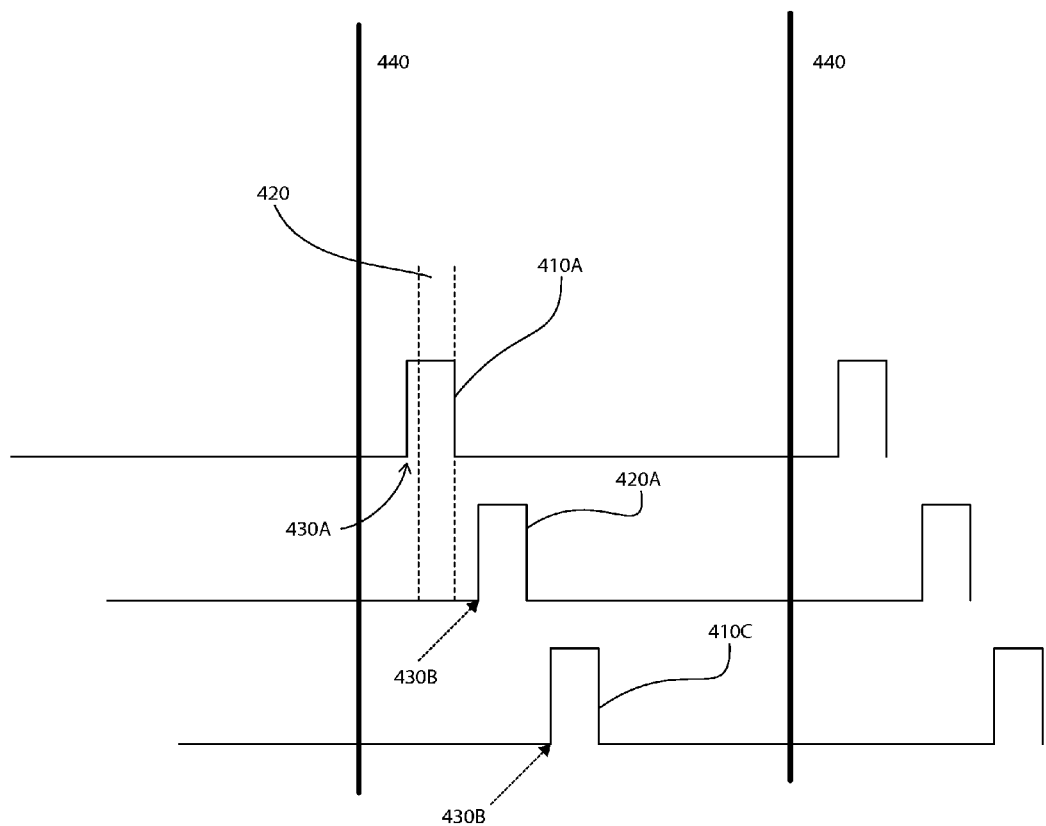
FIG. 4 shows the modified pulse diagram for signals synchronized aquatic species system barrier.

Now referring to FIG. 4 which depicts a timing diagram of the synchronized barriers. The first pulse 410A from the first pulsator 120A is synchronized to a trigger signal 430A. The second pulse 420A is synchronized to the trigger signal but with a delay such that there is no overlap with the first pulse 420A of second pulsator 120B. The third pulse 410C of third pulsator 120C is also synchronized to the trigger signal. The prevention of signal overlap is caused by a trigger signal 430A, 430B, 430C for each pulse which is synchronized by an external and common source. Those skilled in the arts can implement a delay circuit for each pulsator 120 of any length either by digital, analog, or in software. The pulsator trigger is calculated for each pulsator based on the trigger signal and the delay value.

If the GPS signal is lost, then a "GPS Lock" signal is no longer asserted and the system can issue an alarm. When the "GPS Lock" signal is no longer asserted, then a synchronized 1PPS signal is used. This synchronized 1PPS signal may be generated by an internal high-accuracy crystal oscillator, rubidium oscillator, or cesium oscillator. Typically, a high quality crystal oscillator is subject to frequency drift, which is very slow, where weeks will elapse before an occurrence of pulse overlap. In either case, the GPSDO or the alternate signal sources will be known as a reference signal. This reference signal will typically operate at 1PPS.

Figure 5:
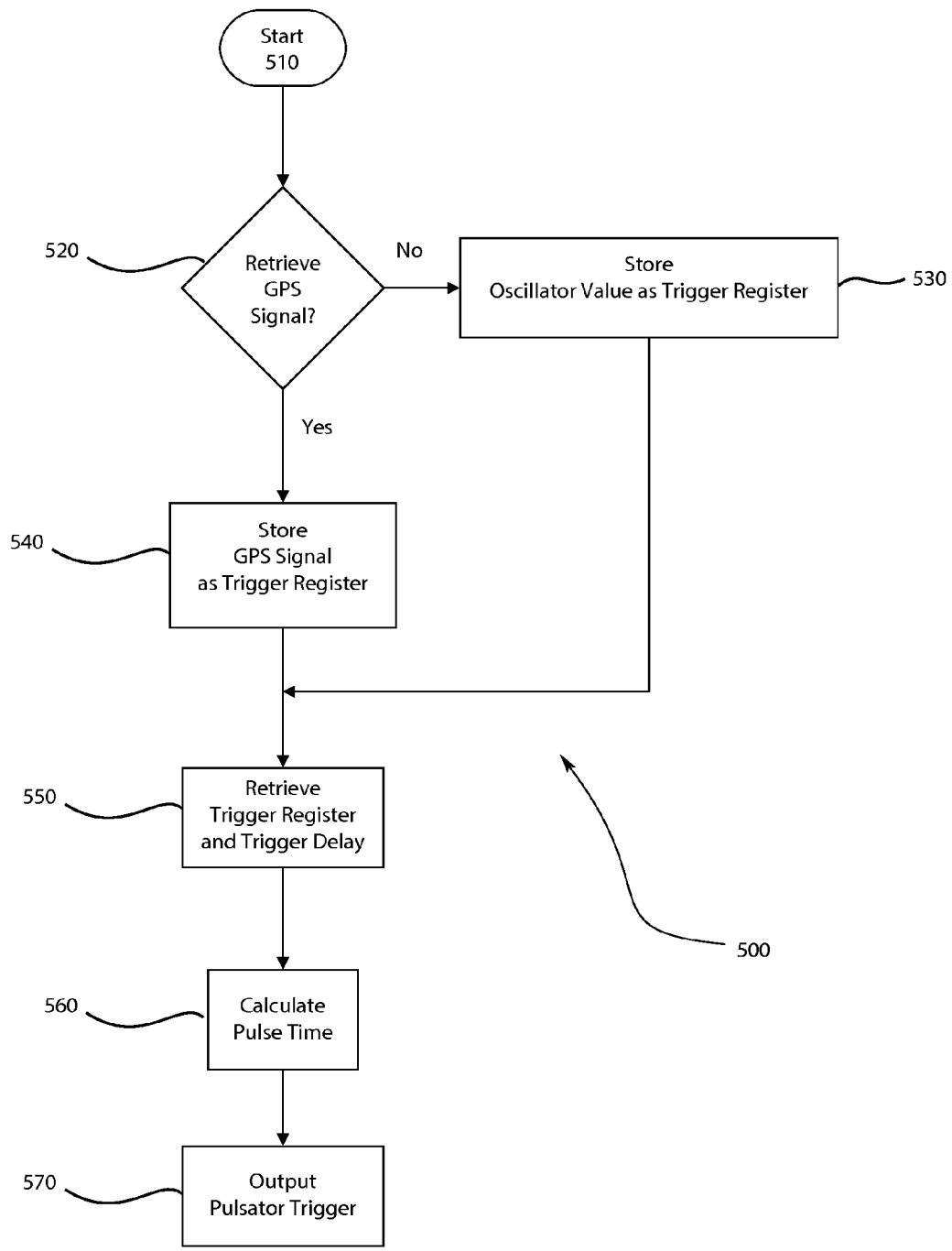
FIG. 5 depicts a flowchart of the process of synchronizing the output multiple pulsators.

Now referring to FIG. 5 that illustrates a flowchart 500 that calculates the pulsator trigger 570. First the system attempts to retrieve the GPS signal 520. If the GPS signal cannot be retrieved then the alternate oscillator value is stored in Trigger Register 530, otherwise the GPS signal is stored in the Trigger Register 540 as the reference signal. Next the Trigger delay and Trigger register are added to create a trigger value for the activation of a pulsator 560.

When this time is reached the pulsator is activated. In this design each pulsator can provide a different delay value of the output pulse.

Figure 6:
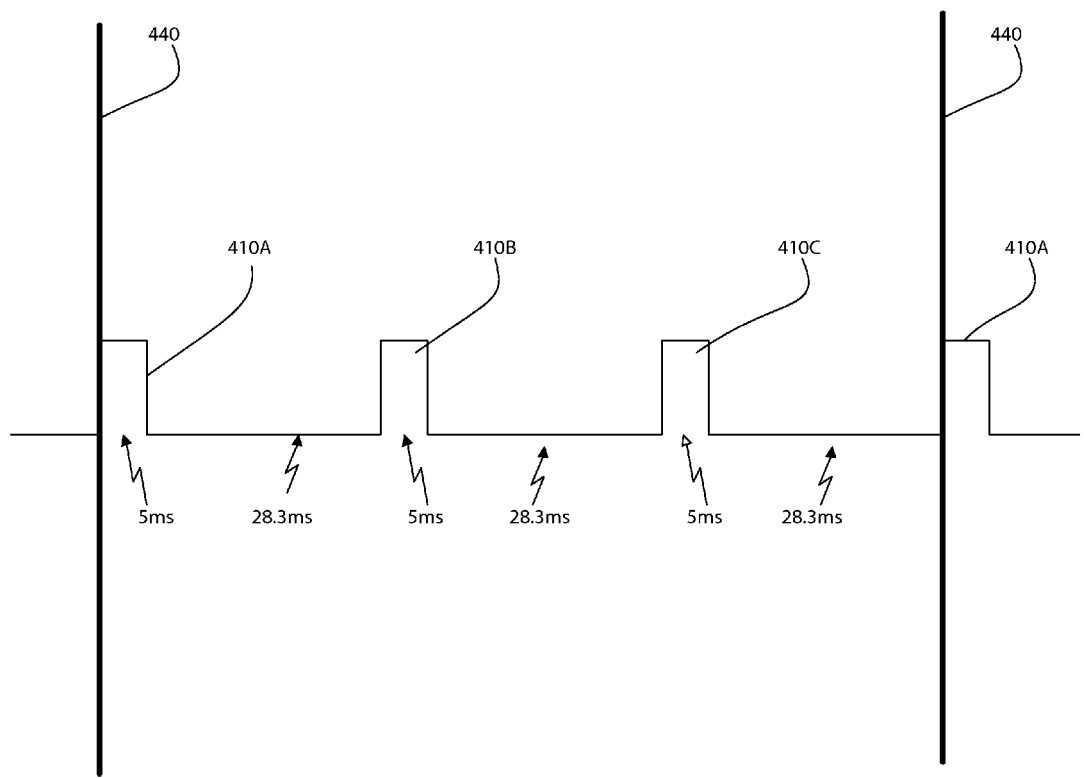
FIG. 6 depicts a timing diagram showing one embodiment of the multiple pulsators.

Now referring FIG. 6, which shows a particular implementation with 3 pulsators. Each pulse duration is approximately 5 mS in width and the time duration in between pulses is 33.3 mS. In this particular example of the three pulsators: the first pulsator initiates a 5 mS pulse 410A, then there is a delay of 28.3 mS, the second pulsator initiates a 5 mS pulse 410B, then there is a delay of 28.3 mS, lastly the third pulsator initiates a 5 mS pulse 410C, there is a delay of 28.3 mS and the sequence repeats. Although FIG. 6 illustrates a particular embodiment, those skilled in the arts will understand that the pulse width of 5 mS may be adjusted depending on the configuration of the electrodes, the waterway, and the aquatic species. Likewise the delay between pulses may be adjusted. Further, the number of pulses per second is also adjustable based on the implementation.

Those skilled in the arts will understand that although the preferred embodiment is a GPS solution, the method of synchronization should not be so limited and one can use other methods of implementation with precise time reference points as alternate embodiments.

The invention claimed is:

1. A method for configuring an electrical fish barrier system to prevent pulsator output signal overlap comprising:
   one or more pulsators reading a reference signal;
   the pulsators adding the reference signal to a delay circuit to create a trigger signal;
   using the trigger signal to activate an output of the pulsator;
   so that when the pulsators operate in an electrical barrier system, the output of the pulsators does not overlap and;
   wherein the reference signal is derived from a Global Positioning Satellite reference source.

2. The method according to claim 1 wherein the Global Positioning Satellite Reference Source is a Global Navigation Satellite System.

3. The method according to claim 1 wherein the Global Positioning Satellite Reference Source is a European Geostationary Navigation Overlay System.

4. The method according to claim 1 wherein the Global Positioning Satellite Reference Source is a Globalnaya Navigatsionnaya Sputnikovaya Sistema.

5. The method according to claim 1 wherein the reference signal is derived from a crystal oscillator reference source.

6. The method according to claim 5 wherein the crystal oscillator reference source is a cesium oscillator.

7. The method according to claim 5 wherein the crystal oscillator reference source is a rubidium oscillator.

8. An apparatus for the desynchronization of an electrical fish barrier system comprising:
   more than one geographically separated fish barrier pulsators,
   each fish barrier pulsator having an input, an output, a converter, a pulsator controller;
   the input electrically connected to a common electrical grid;
   the output electrically connected to a pair of electrodes;
   the converter electrically interposed between the input and the output;
   the pulsator controller operably connected to the converter wherein a reference signal is derived from a Global Positioning Satellite reference source.

9. The apparatus for the desynchronization of an electrical fish barrier system according to claim 8 further comprising:
   where the reference signal is derived from a crystal oscillator reference source.

10. The apparatus for the desynchronization of an electrical fish barrier system according to claim 8 further comprising:
    where the reference signal is derived from an astable vibrator reference source.

11. A process for the dispersal of fish within a navigation lock located on a waterway comprising:
    a first reference pulsator and a second reference pulsator reading a reference signal;
    the pulsators adding the reference signal to a delay circuit to create a trigger signal;
    using the trigger signal to activate an output of the pulsator; wherein the reference signal is derived from a Global Positioning Satellite reference source;
    energizing a first reference electrode pair that is electrically connected to a first reference pulsator so that fish are dispersed away from the first reference electrode pair in a navigation lock;
    waiting a sufficient period of time so that fish disperse and travel over a
    second reference electrode pair;
    energizing the second reference electrode pair that is electrically connected to a second reference pulsator so that fish are dispersed away from the second reference electrode pair;
    so that the fish are moved from a first location to a second location within the navigation lock.

* * * * *